United States Patent [19]

Koashi et al.

[11] Patent Number: 4,893,024
[45] Date of Patent: Jan. 9, 1990

[54] APPARATUS FOR MEASURING THE THICKNESS OF A THIN FILM WITH ANGLE DETECTION MEANS

[75] Inventors: Katsue Koashi, Toyonaka; Yosuke Eguchi, Takatsuki, both of Japan

[73] Assignee: Kurashiki Boseki Kabushiki Kaisha, Okayama, Japan

[21] Appl. No.: 198,494

[22] Filed: May 25, 1988

[30] Foreign Application Priority Data

May 25, 1987 [JP] Japan ................................. 62-128962
May 20, 1988 [JP] Japan ................................. 63-124155

[51] Int. Cl.$^4$ .......................... G01N 21/86; H01J 3/14
[52] U.S. Cl. ................................... 250/560; 250/236; 250/237 G; 356/357
[58] Field of Search .............. 356/357, 381, 382, 361; 250/560, 234–236

[56] References Cited

U.S. PATENT DOCUMENTS

| | | | |
|---|---|---|---|
| 3,016,464 | 1/1962 | Bailey | 250/560 |
| 3,319,515 | 5/1967 | Flournoy | 356/357 |
| 3,551,056 | 12/1970 | Fay et al. | |
| 4,129,384 | 12/1978 | Walker et al. | 356/381 |
| 4,453,828 | 6/1984 | Hershel et al. | 356/357 |
| 4,518,998 | 5/1985 | Warner | 250/235 |
| 4,660,980 | 4/1987 | Takabayashi et al. | |

FOREIGN PATENT DOCUMENTS

| | | | |
|---|---|---|---|
| 0003363 | 1/1978 | Japan | 356/357 |
| 0011106 | 1/1987 | Japan | 356/357 |
| 62-119403 | 5/1987 | Japan | |

Primary Examiner—Edward P. Westin
Assistant Examiner—Michael Messinger
Attorney, Agent, or Firm—Wenderoth, Lind & Ponack

[57] ABSTRACT

An apparatus for measuring the thickness of a thin film utilizing an interferometric method includes a light source for generating a monochromatic light beam, a scanner for scanning the light beam on a thin film in such a manner that an incident angle thereto is continuously varied from $\alpha$ to $(-\alpha)$, a first detector for detecting the incident angle of the light beam and a second detector for detecting an interference pattern caused by light beams reflected from the top and bottom surfaces of the thin film. The thickness of the thin film is obtained in accordance with a geometrical optical relationship defined between adjacent fringes contained in the detected interference pattern.

8 Claims, 7 Drawing Sheets

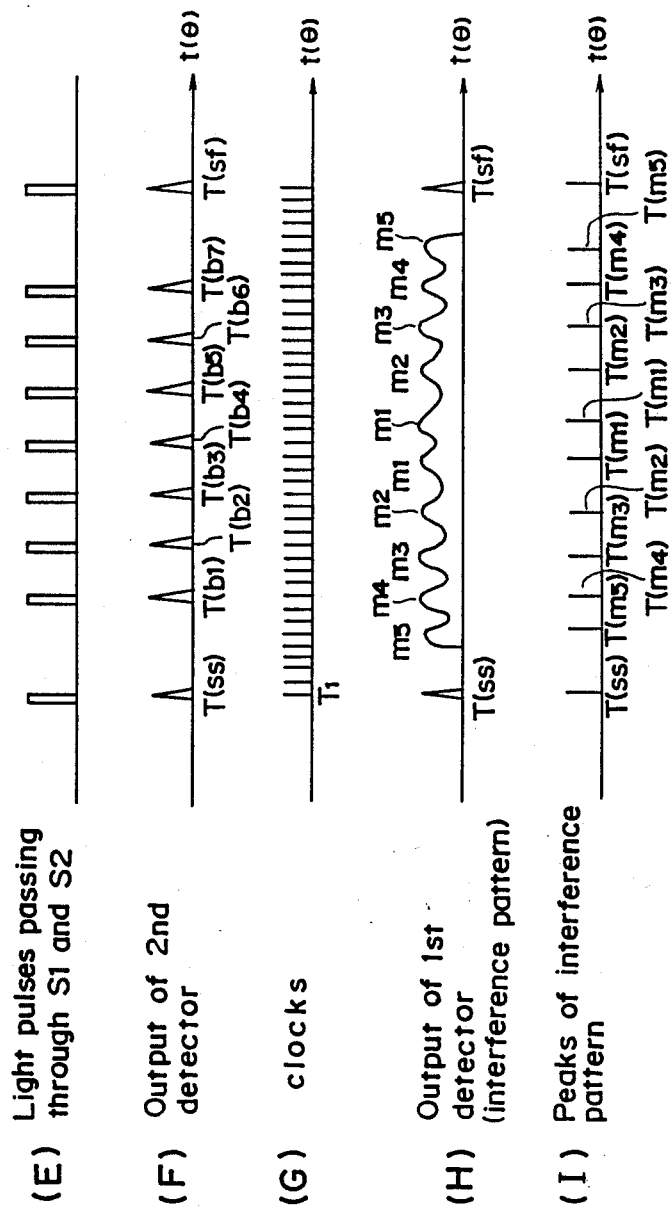

APPARATUS FOR MEASURING THE THICKNESS OF A THIN FILM WITH ANGLE DETECTION MEANS

BACKGROUND OF THE INVENTION

1. Field of the Invention

The present invention relates to an apparatus for measuring the thickness of a thin film.

2. Description of the Prior Art

It is well known that interference fringes can be observed by projecting a light beam onto a thin film having parallel top and bottom surfaces which is optically transparent. The thickness of a thin film can be measured utilizing this interference phenomenon.

Measuring methods for practical use are classified into two methods as follows:

(1) Method utilizing an interferometer

An interferogram is obtained by moving a movable mirror in a system using a Michelson type interferometer with a white light. The thickness of a thin film can be estimated by measuring the separation of the central and side bursts of the obtained interferogram. This interferogram can be also obtained using an FT-IR (Fourier Transformation-Infrared) spectrometer for general use.

(2) Method utilizing a wavelength monochrometer

In a system therefor, a source of white light and a wavelength disperser such as a diffraction grating or a prism are used. The wavelength of an incident light is mechanically varied and an interference spectrum is obtained. This method is essentially the same as that employed in a spectrophotometer of the dispersion type. Alternatively, a spacial interference spectrum generated by a polychrometer is measured by a linear array detector without scanning a monochrometer mechanically.

However, both of these methods still have some problems to be solved in the view point of practical use in the case that they are applied to a production line for a thin film wherein a reasonable resistance against oscillations and the environment are required.

In the former method (1), the initial adjustment and pricise control of a translational movement of a moving mirror are difficult and, furthermore, this system is unstable due to mechanical oscillations and the side bursts of an interferogram cannot usually be clearly observed.

In the latter method (2), it is difficult to obtain a reasonable mechanical stability and a high-speed thickness measuring of a running film since the monochrometer has to be scanned mechanically. In the method wherein the linear array detector is used, an applicable range of wavelength is limited, and a high sensitivity cannot be obtained and, also, the magnification of the optical system is required to be constant though a fast processing time can be obtained.

A key point of the method for accurately measuring the thickness of a thin film utilizing the optical interference phenomenon is to obtain a clearly distinguishable and stable interference fringe pattern.

The visibility of the interference pattern depends mainly on the transparency of a film to be measured. Due to this reason, films measurable by the conventional method are limited and restricted. In other words, the method cannot be applied to a film having a low transparency such as a translucent film, a coating layer on a metal plate or the like.

In order to extend the applicability to various films, the choice of a light source is important. A laser is ideal as a light source because of its monochromatic and coherent characteristics, directional property and high intensity. But, the laser is not applicable to the method mentioned above since it is a monochromatic light.

On the contrary, in U.S. Pat. No. 4,660,980, there is disclosed an apparatus for measuring the thickness of a thin film wherein a coherent light beam is used to scan the thin film and the difference between an order of interference fringes obtained for one scan by the coherent light beam is counted to detect the thickness of the thin film.

However, an optical system used in the apparatus is not easy to adjust since a scanning optical system and a detecting optical system are formed separately. Furthermore, it is difficult to calibrate an incident angle of the incident beam accurately.

SUMMARY OF THE INVENTION

It is an object of the present invention to provide an apparatus for measuring the thickness of a thin film which contains all of its elements in a housing.

It is another object of the present invention to provide an apparatus for measuring the thickness of a thin film which can obtain a center point of interference fringes with respect to the normal of the film plane.

It is a further object of the present invention to provide an apparatus for measuring the thickness of a thin film which can calculate the thickness using the relationship between adjacent fringes.

It is one more object of the present invention to provide an apparatus for measuring the thickness of a thin film which can obtain the thickness by processing data with a digital circuit.

It is a still further object of the present invention to provide an apparatus for measuring the thickness of a thin film which can correct errors caused by various fluctuations of the thin film to be measured.

It is also an object of the present invention to provide an apparatus capable of measuring the thickness of a thin film even if it is translucent.

In order to achieve these objects, according to the present invention, there is provided an apparatus for measuring the thickness of a thin film, having top and bottom surfaces, utilizing an interferometric method, comprising: a light emitting means for generating a monochromatic light beam; a beam scanning means including a deflection means for deflecting the light beam continuously and repeatedly and a lens means, having an optical axis, for projecting the deflected light beam on a thin film arranged substantially perpendicular to said optical axis of said lens means, said deflection means deflecting the light beam so as to scan it symmetrically with respect to a normal of the thin film to be measured; an angle detection means including a half mirror for splitting the light beam into an impinging beam for impinging onto the thin film and a reference beam and a light receiving means for detecting an incident angle of said impinging beam with respect to the thin film by receiving said reference beam after having been split by said half mirror, said half mirror being arranged on an optical path from said deflection means to said lens means and inclined at 45° with respect to said optical axis of said lens means; an interference pattern detection means for detecting an interference pattern which is caused by interference between light beams reflected from the top and bottom surfaces of the thin film having passed through said lens means of said beam scanning means and deflected by a rear surface of said half mirror; and a calculating means for calculating the thickness of the thin film based on said interference pattern detected by said interference pattern detection means and the incident angle of the impinging beam detected by said angle detection means.

It is to be noted that the term "film" should be interpreted to include not only an actual film but also any thin covering or coating irrespective to whether or not it is transparent.

BRIEF DESCRIPTION OF DRAWINGS

These and other objects and features of the present invention will become more apparent when the preferred embodiment of the present invention is described in detail with reference of accompanied drawings in that;

FIGS. 4(a) and 4(b) show a timing chart for showing relationship among an interference pattern, optical and electric signals obtained by a slit means and a clock signal generating means;

DETAILED DESCRIPTION OF THE PREFERRED EMBODIMENT (a) Principle utilized in the present invention As is well known, the reason why an interference phenomenon is caused by a thin film is based on the fact that a monochromatic light impinging onto the thin film is divided into a reflected light and a transmitted light by a boundary surface defined between the ambient air and the thin film. When the reflected light and the transmitted light are superposed, the intensity I of the superposed light is given by the following equation:

$$I = A^2 + B^2 2AB \cos(2\pi/\lambda)\Delta \quad (1)$$

wherein A and B are respective amplitudes of reflected and transmitted light, $\lambda$ is a wavelength of the incident light and $\Delta$ is a difference between the light paths of reflected and refracted light.

Namely, the intensity I is a function of a phase difference $(2\pi\Delta/\lambda)$ between them.

As is apparent from the equation (1), the intensity I of the superposed light is varied with the difference $\Delta$ between the two light paths.

Figure 2:
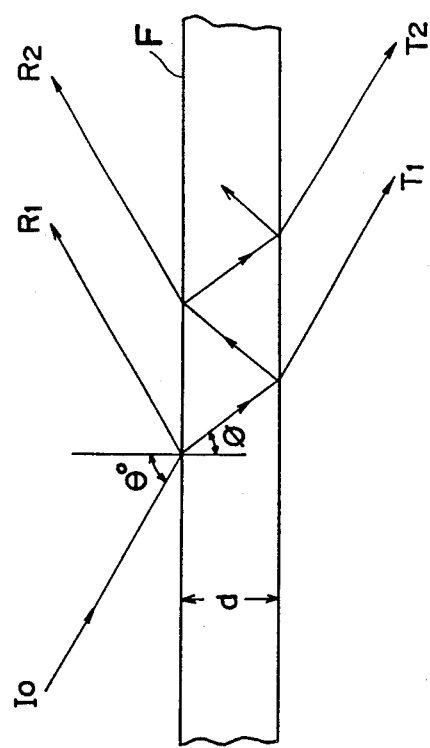
FIG. 2 is an explanative view for showing a mechanism of interference caused by two light rays.

Referring to FIG. 2 wherein an incident light Io impinges at an incident angle $\theta$ defined to the normal of the top surface of a thin film F which has the bottom surface parallel to the top surface, an optical path difference $\Delta_r$ between first and second reflected light R1 and R2 and an optical path difference $\Delta_t$ between first and second transmitted light T1 and T2 are represented by the following equations:

$$\Delta_r = 2nd \cos \phi + \lambda/2 \quad (2)$$
$$= \sqrt{2d\,n^2 - \sin^2 \theta} + \lambda/2$$

$$\Delta_t = 2nd \cos \phi = 2d \sqrt{n^2 - \sin^2 \theta} \quad (3)$$

wherein, $\phi$ is a refraction angle, n is a refractive index of the thin film and d is the thickness thereof.

By substituting equations (2) or (3) into the equation (1), the intensity distribution of the interference pattern is expressed as a function of the incident angle $\theta$.

If the thickness d of the thin film is constant, an interference pattern having bright and dark fringes namely peak maxima and minima is obtained when the incident angle $\theta$ satisfies the following equations (4) or (5).

$$2d\sqrt{n^2 - \sin^2 \theta} = (2m + 1)(\lambda/2) \quad (4)$$

$$2d\sqrt{n^2 - \sin^2 \theta} = 2m(\lambda/2) \quad (5)$$

wherein m (=0, 1, 2, ...) is an order of each interference fringe.

These equations give conditions for giving maxima and/or minima of the intensity distribution of interference fringes. More concretely, the equation (4) gives bright fringes in the case of the reflected light and dark fringes in the case of the transmitted light. Also, the equation (5) gives dark fringes in the case of the reflected light and bright fringes in the case of the transmitted light.

According to the equations (4) or (5), if orders m of individual interference fringes are identified explicitly, the thickness d of the thin film is calculated since the refractive index n, the incident angle $\theta$ and the wavelength $\lambda$ of the incident light are known. However, it is not so easy to identify the order m of each interference fringe.

In order to solve this problem, let us consider the equation (4) with respect to the reflected light assuming that the wavelength $\lambda$ is constant.

Let's consider the adjacent p-th and (p+1)-th bright fringes from the innermost of angular radius $\theta_p$ and $\theta_{p+1}$, respectively. In this case, the following equation is easily obtained using the equation (4):

$$2d(\sqrt{n^2 - \sin^2 \theta_p} - \sqrt{n^2 - \sin^2 \theta_{p+1}}) = \lambda \quad (6)$$

As is apparent from the equation (6), the order of the fringes does not appear explicitly therein. Accordingly, if the incident angles $\theta_p$ and $\theta_{p+1}$ which cause p-th and (p+1)-th bright fringes from the center are determined, the thickness d can be determined using the equation (6).

(b) Composition of the optical system

In an apparatus for measuring the thickness according to the present invention, a thin film is scanned by a light pencil which is deflected by a rotating mirror so as to vary the incident angle of the light beam to the thin film. According to this scan, an interference pattern is obtained and the thickness can be calculated based on the maxima and minima of fringes with use of the equation (6).

Figure 1:
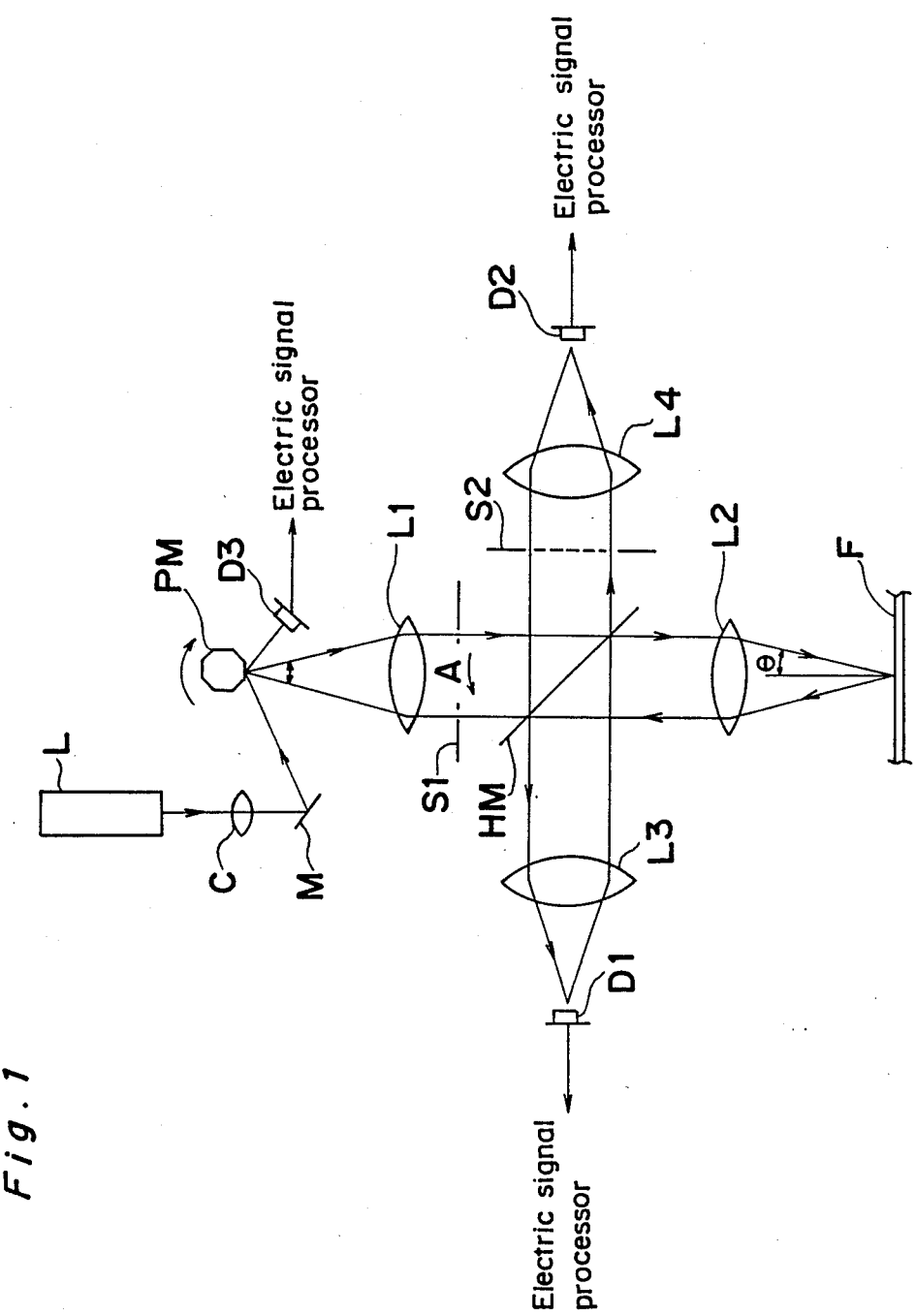
FIG. 1 shows a composition of an optical system according to the present invention.

FIG. 1 shows a composition of the optical system according to the preferred embodiment of the present invention.

The optical system is substantially comprised of a light source L for generating a monochromatic light beam such as a laser beam, a rotating mirror PM for deflecting the beam, first and second lens means L1 and L2 forming a point-to-point image converter wherein the first lens means L1 converts a divergent beam to a parallel beam and the second lens means L2 converts the parallel beam a convergent beam, a beam splitter HM such as a half-mirror interposed between the first and second lens means L1 and L2 for splitting a light beam into a measuring beam impinging onto a thin film and a reference beam for checking an incident angle of the impinging beam, a first detector D1 with a collecting lens means L3 for detecting an intensity distribution of optical interference fringes, a grid S2 consisting of a succession of slits formed on an opaque screen and a second detector with a collecting lens means L4 for checking an incident angle of the impinging beam.

The monochromatic light beam emitted from the light source L such as a He-Ne gas laser or a laser diode is collimated by a collimating lens means C so that an incident beam emerges as a smaller parallel pencil of about 100 μm diameter and, then, reflected by a reflecting mirror M and directed to the center point of the rotating mirror PM, that is the focus of the lens means L1.

The light beam reflected by the rotating mirror PM is parallel to the optical axis by the first lens means L1, then, passes a slit means S1 for restricting the scanning angle within a predetermined range and split into two beams by the beam splitter HM.

A measuring beam transmitted through the beam splitter HM is bent by the second lens means L2 so as to impinge onto a point on the surface of the thin film which is set on the focal plane of the lens means L2. Namely, the incident point coincides with the focus of the lens means L2. Reflected beams from the top and bottom surfaces of the film are parallel to the optical axis by the lens means L2, then, reflected by the beam splitter HM and, then, collected onto the first detector D1 by the collecting lens L3.

On the other hand, the beam splitter HM reflects a part of the incident light beam as a reference beam toward the second detector D2 with the collecting lens means L4. Between the beam splitter HM and the second detector D2, the grid means S2 is interposed in order to generate clock pulse signals each corresponding to a specific predetermined incident angle of the light beam generated by the rotating mirror PM. Said clock pulse signals are detected by the second detector D2 arranged at the focus of the lens means L4.

Furthermore, a third detector D3 is provided for detecting a start timing of a scanning span by the light beam.

In accordance to the rotation of the rotating mirror PM, the incident angle $\theta$ is varied at a predetermined constant angular velocity symmetrically with respect to the common optical axis which usually coincides with the normal of the thin film plane.

Figure 4A:
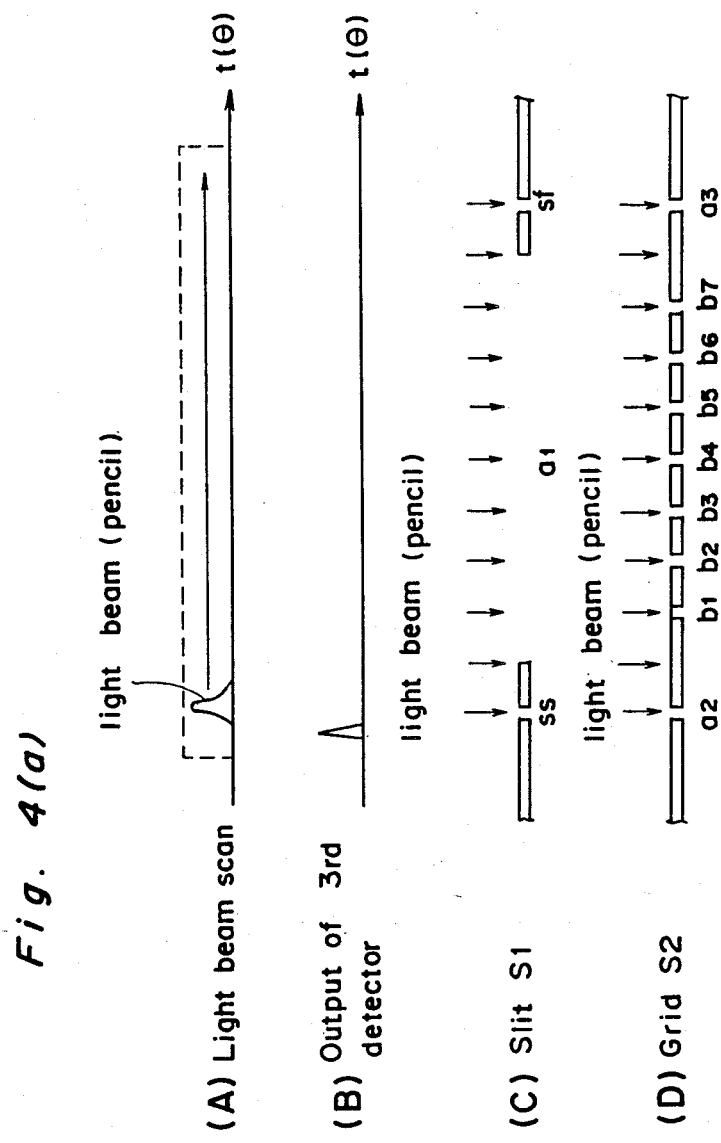

Structures of the slit means S1 and the grid means S2 are disclosed in (C) and (D) of FIG. 4(a), respectively.

The first slit means S1 has a wide aperture $a_1$ for restricting the incident angle within a predetermined range and two slits ss and sf for determining a start timing of a scanning span and a stop timing thereof, respectively.

The grid means S2 has seven slits from $b_1$ to $b_7$ formed at a predetermined constant pitch in the central portion thereof which corresponds to the aperture $a_1$ of the slit means S1 and other two slits $a_2$ and $a_3$ formed outside of the seven slits $b_1 \sim b_7$ which are optically equivalent to two slits ss and sf of the slit means S1, respectively.

The slit ss of the slit means S1 gives a start timing for starting to count clock pulses CLK and the slit sf gives a stop timing for finishing the counting operation.

The seven slits from $b_1$ to $b_7$ are provided in order to check a scanning time by the light beam, namely, they give time reference signals $T(b_1)$ to $T(b_7)$.

(c) Electric circuit for processing detection signals

Figure 3:
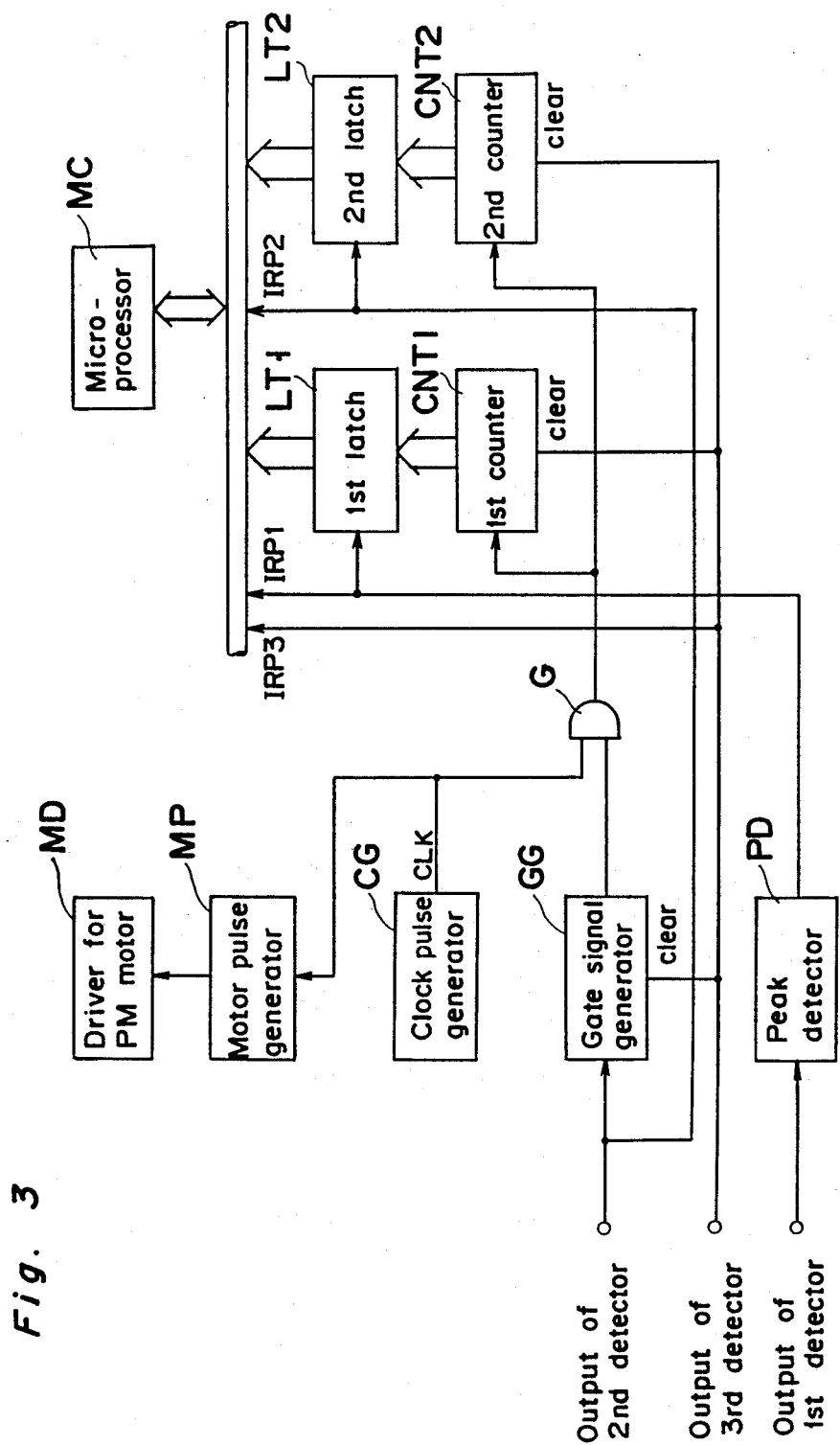
FIG. 3 is a block diagram of a processing circuit for processing signals according to the preferred embodiment of the present invention.

FIG. 3 shows a block diagram of the electric circuit for processing detected signals.

In order to synchronize all operations with the standard clock pulse signal CLK, there is provided a clock pulse generator CG. Standard clock pulse signals CLK generated by the clock pulse generator CG are sent to a motor driving control circuit MP for generating motor pulses to be applied to a motor driver MD for a rotating mirror motor (not shown). These clock pulses are also applied, via an AND gate G, to the inputs of first and second counters CNT1 and CNT2 provided for counting them. Parallel outputs of the first and second counters CNT1 and CNT2 are connected, via first and second latches LT1 and LT2, to a microprocessor MC, respectively.

Respective temporal count values of the first and second counters CNT1 and CNT2 are latched into the first and second latches LT1 and LT2 by enable signals from the first and second detectors D1 and D2, respectively. The latched data are read into the microprocessor MC when interrupt request signals IRP1 and IRP2 are acknowledged, respectively.

The counting operations by the first and second counters CNT1 and CNT2 are carried out during the preselected span interval determined from a start signal T(ss) given by the slit ss to a stop signal T(sf) given by the slit sf.

A gate signal generator GG selects only a start slit signal T(ss) and an stop slit signal T(sf) from among all signals sent from the second detector D2 and outputs these two signals as gate signals to the AND gate G. In other words, reference slit signals $T(b_1)$, $T(b_2)$, ..., $T(b_7)$ generated by the seven reference slits from $b_1$ to $b_7$ are masked by the gate signal generator GG.

The output signal of the first detector D1 is applied to a peak detector PD. The peak detector PD discriminates individual peak maxima $p(m_i)$ of interference fringes and outputs pulse signals $T(m_i)$. By each of pulse signals $T(m_i)$, a count value CV $\{T(m_i)\}$ of the first counter CNT1 at that time is latched into the first counter CNT1 and, then latched data CV $\{T(m_i)\}$ is read into the microprocessor MC by an interrupt service routine caused by an interrupt request signal IRP1.

The count data CV $\{T(m_i)\}$ read into the microprocessor MC corresponds to an incident angle $\theta(m_i)$ since the relationship between the count data CV {T(m$_i$)} and the incident angle θ(m$_i$) is determined one to one beforehand.

By each of reference slit signals from the second detector D2, a count value CV {T(b$_i$)} of the second counter CNT2 at that time is latched into the second latch LT2. The latched data CV {T(b$_i$)} is read into the microprocessor MC when an interrupt request signal IRP2 is input thereinto.

The output signal of the third detector D3 is used as a start signal of a scan cycle by the rotating mirror PM and, therefore, is used to reset the first and second counters CNT1 and CNT2 and the gate signal generator GG. Furthermore, it is used as an interrupt request signal IRP3 to the microprocessor MC.

(d) Measurement of the thickness of a thin film

Referring to FIGS. 1, 3 and 4, the measurement of the thickness of a thin film will be explained.

At first, a scan cycle is initiated by a signal from the third detector D3, which is an interrupt request signal IRP3 to the microprocessor MC to execute a scan cycle routine.

The first and second counters CNT1 and CNT2 and the gate signal generator GG are reset by the signal from the third detector D3.

Since the light beam is divided by the beam splitter HM, a part of the light beam having passed through the scan start slit as of the slit means S1 passes through the scan start slit a$_2$ of the grid means S2.

When the second detector D2 detects the part of the light beam having passed through the scan start slit a$_2$ of the grid means S2, the gate pulse generator GG outputs a gate pulse to the AND gate G. The AND gate G allows clock pulse signals CLK from the clock generator CG to pass therethrough and, therefore, clock pulse signals CLK are counted up by the first and second counters CNT1 and CNT2 respectively.

As stated above, reference slits from b$_1$ to b$_7$ formed on the grid means S2 correspond to predetermined incident angles to the thin film F and, therefore, are utilized for checking real incident angles to be detected by the first detector D1. Namely, light beams having passed through the reference slits b$_1$ to b$_7$ are detected by the second detector D2. Accordingly, pulse signals T(b$_1$) to T(b$_7$) from the second detector D2 correspond to specific predetermined incident angles, respectively, and a temporal count value CV {T(b$_i$)} of the second counter CNT2 at that time T(b$_i$) is latched into the second latch LT2. The latched count data CV {T(b$_i$)} is read into the microprocessor MC by an interrupt service routine caused by interrupt request signal IRP2. These count data CV {T(b$_i$)} are used to check real incident angles which are predetermined with use of a standard sample.

When the light beam having passed through the scan stop slit a$_3$ of the grid means S2 is detected by the second detector D2, the gate pulse generator GG disable the AND gate G and terminates one scan. Similarly to the above, the next scan cycle is started.

Light beam having passed through the aperture a$_1$ of the slit means S1, the beam splitter HM and the second mirror L2 impinges onto the thin film F. The light beam is scanned on the thin film F at a constant angular velocity varying the incident angle θ from (α) to (−α) according to the rotation of the rotating mirror PM. Due to this laser scan, the output signal of the first detector D1 shows an interference pattern as shown by (H) of FIG. 4(b). More concretely, the start signal T(ss) having passed through the scan start slit ss of the slit means S1 at first, then, the interference fringe m$_i$ and the stop signal T(sf) having passed through the scan stop slit sf.

The peak detector PD detects peak maxima (m$_i$) of the interference pattern obtained and outputs enable signals T(m$_i$) to the first latch LT1 and an interrupt request signal IRP1 to the microprocessor MC.

By each of enable signals T(m$_i$), a count data CV {T(m$_i$)} of the first counter CNT1 at that time T(m$_i$) is latched into the first latch LT1 and the latched count data CV {T(m$_i$)} is read into the microprocessor MC when an interrupt request signal IRP1 is acknowledged.

The microprocessor MC processes these count data CV {T(m$_i$)} to obtain the thickness of the thin film to be measured using the predetermined relationship between the count data CV {T(m$_i$)} and the incident angles θ(m$_i$) at the time T(m$_i$) which is provided as a calibration or transformation table TB1 for transforming the count values into corresponding incident angles in the present preferred embodiment. This table is made based on an analysis of an interference fringe pattern obtained using a standard sample whose refractive index and thickness are known and is stored in a ROM (Read Only Memory) of the microprocessor MC.

Also, one more transformation table TB2 is prepared in order to determine relationship between each of reference count values CV {T(b$_i$)} and the incident angle θ. This relationship ss is determined based on an interference fringe pattern measured by the first detector D1 using a standard thin film whose refraction index and thickness are known. In other words, each incident angle corresponding to each count data CV {T(b$_i$)} is calculated theoretically from data of the interference fringe pattern obtained. Thus, each incident angle corresponding to each count data CV {T(b$_i$)} is determined using this table TB2 in order to check real incident angles obtained by the transformation table TB1. This table TB2 is also stored in the ROM of the microprocessor MC.

Calculation of the thickness of a thin film is done as follows.

As mentioned above, each count data CV {T(m$_i$)} corresponding to each peak maximum m$_i$ (bright fringe) of an interference pattern obtained has been read into the microprocessor MC.

If a thin film to be measured is set perpendicularly to the optical axis of the scan system, each count data CV {T(m$_i$)} is transformed into an incident angle θ$_i$ referring to the standard transformation table TB1.

According to the equation (6) representing relationship between adjacent p-th and (p+1)-th maxima from the center of fringes, the thickness d is obtained as follows:

$$d = (\lambda/2)/[\sqrt{n^2 - \sin^2\theta_p} - \sqrt{n^2 - \sin^2\theta_{p+1}}] \quad (7)$$

Since the wavelength λ of the laser and the refractive index n of the thin film are known prior, the thickness d is calculated using the adjacent incident angles θ$_p$ and θ$_{p+1}$.

Usually, the interference pattern includes a plurality of fringes as shown by (H) of FIG. 4(b). Accordingly, it is desirable to take an average with respect to a plurality of thicknesses obtained from plural adjacent pairs of fringe (m$_1$, m$_2$), (m$_2$, m$_3$), . . . , (m$_p$, m$_{p+1}$) in order to enhance the accuracy of measurement. Furthermore, in the case that the thin film is set stationally at the focal plane of the lens means L2, it is desirable to repeat the optical scan by rotating the rotating mirror PM in order to take a multiple average with respect to averages obtained by respective scan cycle. This contributes to the further enhancement of accuracy of measurement.

It is to be noted that a thin film is not always set perpendicular to the optical axis of the optical scan system. Especially, in the case of a running film, a vertical fluctuation and/or an angular fluctuation are caused inevitably.

In view of this point, the thickness measuring system is desired to be a system which is stable to film fluttering movement or is able to correct errors caused thereby.

In order for that, a scanning speed of the light beam which is determined from a rotation speed of the rotating mirror and/or a number of mirrors should be chosen so as to be fast enough so as to be tolerable without noticeable effect on film flutter movement. This is the most effective way to avoid a complex processing for correcting errors due to film fluctuations. Although the incident angle to a thin film plane is not varied by a fluctuation thereof in the vertical direction, a path of a light reflected from the thin film obtained when it is fluctuated in the vertical direction is shifted from that obtained when the thin film is set correctly. This shift will be allowed within a certain range by using the first detector D1 having a relatively large photo-receiving area.

Since it is not necessary to measure a spatial interference fringe pattern in the system according to the present invention, the measurement is not affected by a magnification or a distortion of each of lenses used in the optical scan system.

With respect to an angular fluctuation of a thin film, namely an angular shift of the normal of the thin film from the optical axis of the optical scan system, it is possible to correct errors caused thereby using a suitable algorithmic processing since the detected interference pattern includes data with respect to an angular shift.

Namely, in this algorithmic processing, the center of the measured interference fringes is sought at first utilizing a symmetry which every interference fringes always shows. This center of symmetry of the interference fringes corresponds to an incident angle of zero degree, namely a timing at that the light beam impinges vertically onto the thin film plane.

The angular shift can be sought with use of a shift amount of the center of symmetry from the correct center of symmetry. Thereafter, every count value of standard clock pulses corresponding to each peak maximum is corrected based on the sought angular shift. Therefore, the thickness of the thin film can be calculated exactly using of corrected incident angles.

If the present measuring system is applied to measuring the thickness of a thin flim being now produced, it is mounted on a carriage on a single side of the film which can be moved in a traverse direction to the running film in order to measure the thickness over the whole width of the film.

The present measuring apparatus employed in film thickness gaging can be operate in the open on reflected radiation, making it posible to mount the entire apparatus on a single side of the film process.

[Second Preferred Embodiment]

Figure 5:
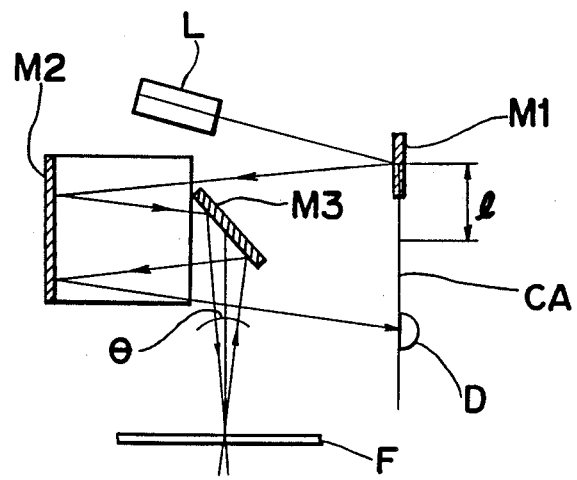
FIG. 5 is a vertical cross-sectional view of an optical scanning system according to the second preferred embodiment of the present invention.
Figure 6:
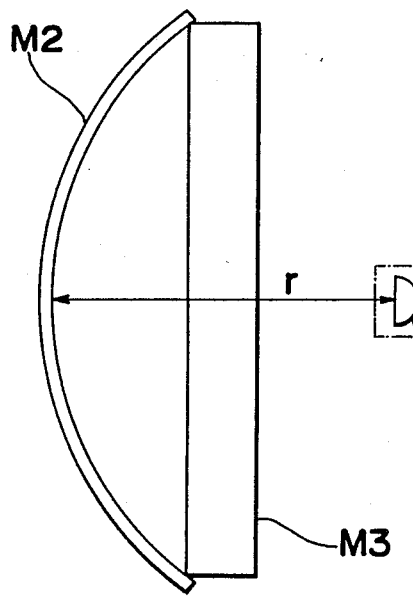
FIG. 6 is a plan view of the optical scanning system shown in FIG. 5.

FIGS. 5 and 6 are a vertical cross-sectional view and a plan view of a scanning optical system according to the second preferred embodiment of the present invention, respectively.

In the second preferred embodiment, three mirrors M1, M2 and M3 are used for scanning a monochromatic light beam emitted from a laser emitting means L.

The mirror M1 is a plane mirror for deflecting the emitted light beam so as to impinge onto the second mirror M2 comprised of a cylindrical mirror which is arranged so as for the central axis CA thereof to coincide with the direction of the light beam emitted from the laser source L. The mirror M1 is supported by an axis (not shown) which coincides with the central axis CA of the cylindrical mirror M2 and is rotated around said axis at a predetermined angular velocity by a suitable driving mechanism (not shown).

The mirror M3 is a plane mirror for reflecting a beam reflected from the mirror M2 to a thin film F and for reflecting a beam reflected from the thin film F to a photo-detector D which is arranged so as for the detecting surface thereof to coincide with the central axis CA of the cylindrical mirror M2. The center of the mirror M1 is positioned at a height l from the center of height of the cylindrical mirror M2.

Figure 7:
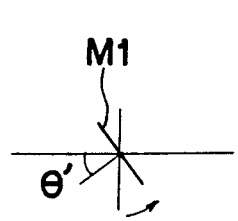
FIG. 7 is an explanative view for showing a rotational angle $\theta'$ of the first mirror.

As shown in FIG. 6, the cylindrical mirror M2 has a radius of r and, as shown in FIG. 7, a rotation angle $\theta'$ of the mirror M1 is defined with respect to a horizontal axis passing the center thereof.

Figure 8:
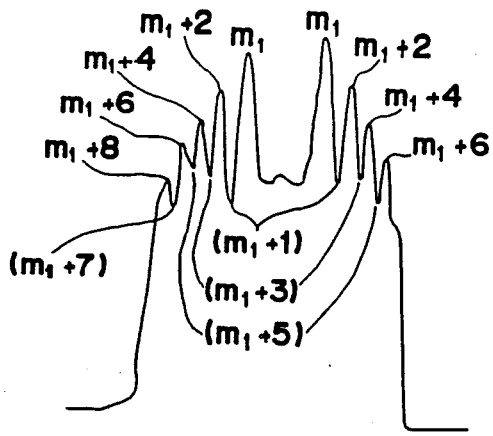
FIGS. 8 and 9 show interference patterns measured using the optical scanning system shown in FIG. 5, respectively.
Figure 9:
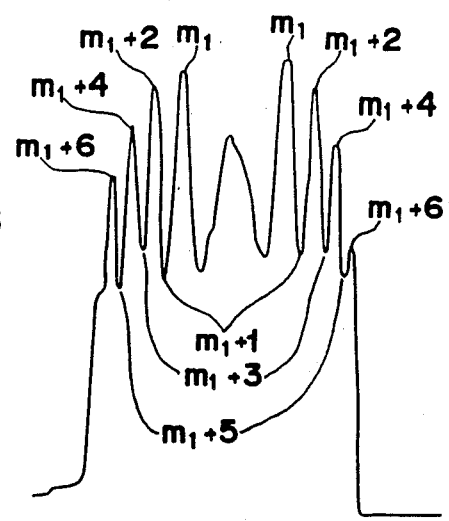

FIGS. 8 and 9 show interference patterns obtained when two thin films of PET (n=1.5) having respective nominal thicknesses of 16 and 12 $\mu$m are measured using the scanning optical system of the second preferred embodiment.

The method for calculating the thickness of a thin film is substantially same to that mentioned above. However, in the second preferred embodiment, all of bright and dark fringes obtained are used in order to calculate the thickness more accurately.

Let us assume that each of bright and dark fringes is numbered in the ascending order from the innermost fringe $m_1$, as shown in FIG. 8 or FIG. 9.

Using equations (4) and (5) mentioned above, the relationship between the most inside fringe $m_1$ and the i-th fringe therefrom is given by the following equation:

$$\sqrt{n^2 - \sin^2 \theta m_{1+i}} = \frac{\lambda}{4d}(m_1 + i) \quad (7)$$

wherein n is a refractive index of the thin film to be measured, $\lambda$ is a wavelength of the light beam used and $\theta(m_{1+i})$ is an incident angle of the light beam corresponding to the i-th fringe from the innermost bright fringes $m_1$.

The incident angle $\theta$ is calculated from the rotational angle $\theta'$ of the mirror M1 by the following equation as is easily understood from a geometrical optical consideration of the optical scanning system according to the present preferred embodiment.

$$\sin^2 \theta = \frac{\left(\frac{l}{2r}\right)^2 + \sin^2 2\theta'}{\left(\frac{l}{2r}\right)^2 + 1} \quad (8)$$

wherein l, r and θ' are defined already in FIGS. 5, 6 and 7, respectively.

Figure 10:
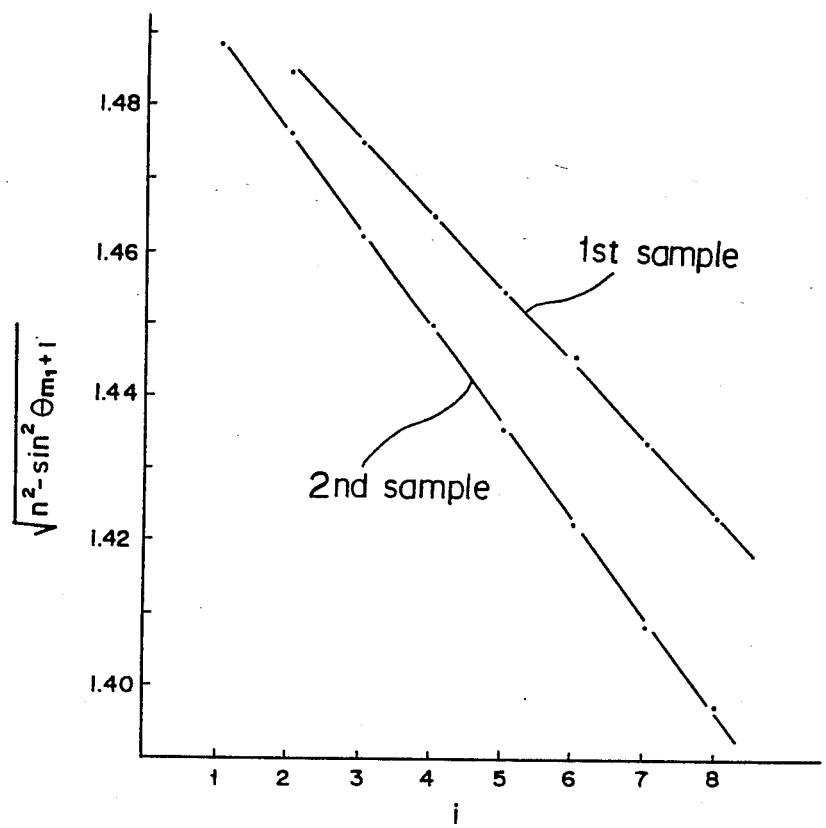
FIG. 10 is a graph showing data obtained from the interference patterns shown in FIGS. 8 and 9, respectively.

FIG. 10 shows data plotted with respect to each of the interference patterns. These are obtained under conditions of r=44.9 mm, l=4.75 mm, n=1.5, λ=0.6328 μm (He-Ne laser) and the rotation speed of the mirror M1=1800 rpm.

These data are process using the least square approximation in order to evaluate the slope (−λ/4d) in the equation (7). The slopes obtained are (−0.0102) and (−0.0132), respectively, and, accordingly, the thicknesses calculated from them are 15.5 μm and 12.0 μm, respectively.

The preferred embodiments described herein are illustrative and not restrictive, the scope of the invention being indicated by the appended claims and all variations which come within the meanings of the claims are intended to be embraced herein.

What is claimed is:

1. An apparatus for measuring the thickness of a thin film, having top and bottom surfaces, utilizing an interferometric method, comprising:

a light emitting means for generating a monochromatic light beam;

a beam scanning means including a deflection means for deflecting the light beam continuously and repeatedly and a lens means, having an optical axis, for projecting the deflected light beam on a thin film arranged substantially perpendicular to said optical axis of said lens means, said deflection means deflecting the light beam so as to scan it symmetrically with respect to a normal of the thin film to be measured;

an angle detection means including a half mirror for splitting the light beam into an impinging beam for impinging onto the thin film and a reference beam and a light receiving means for detecting an incident angle of said impinging beam with respect to the thin film by receiving said reference beam after having been split by said half mirror, said half mirror being arranged on an optical path from said deflection means to said lens means and inclined at 45° with respect to said optical axis of said lens means;

an interference pattern detection means for detecting an interference pattern which is caused by interference between light beams reflected from the top and bottom surfaces of the thin film having passed through said lens means of said beam scanning means and deflected by a rear surface of said half mirror; and a calculating means for calculating the thickness of the thin film based on said interference pattern detected by said interference pattern detection means and the incident angle of the impinging beam detected by said angle detection means.

2. An apparatus for measuring the thickness of a thin film as claimed in claim 1, wherein said deflecting means of said beam scanning means is comprised of a rotating mirror and a driving means therefor.

3. An apparatus for measuring the thickness of a thin film as claimed in claim 1, wherein said beam scanning means includes another lens means for collimating the light beam deflected by said deflecting means.

4. An apparatus for measuring the thickness of a thin film as claimed in claim 1, wherein said interference pattern detection means is comprised of a photo-detector and another lens means for focusing the reflected light beams on the photo-detector.

5. An apparatus for measuring the thickness of a thin film as claimed in claim 1, wherein said angle detecting means is comprised of a counting means for counting clock pulses generated by a clock generating means in synchronization with the scanning of the light beam.

6. An apparatus for measuring the thickness of a thin film as claimed in claim 1, further comprising a reference beam detecting means for detecting the split reference beam in order to check an incident angle of the impinging beam with respect to the thin film.

7. An apparatus for measuring the thickness of a thin film as claimed in claim 6, wherein said reference beam detecting means includes a grid means consisting of a plurality of equidistant slits disposed on an opaque screen and a detecting means for detecting individual beams having passed through respective slits whereby the detected incident angle is checked using beams detected by said detecting means.

8. An apparatus for measuring the thickness of a thin film as claimed in claim 1, further comprising a correction means for correcting the incident angle of the impinging beam with respect to the thin film in accordance with a shift of a center of said interference pattern from that of an interference pattern which is obtained when the normal of the thin film coincides with the optical axis of said lens means, wherein the thickness of the thin film is calculated from a relationship between a corrected incident angle and an interference pattern detected by said interference pattern detection means.

* * * * *